Sept. 28, 1965 L. F. MENTZER ET AL 3,209,325
SYSTEM FOR EMERGENCY REMOTE CONTROL OF TRAFFIC SIGNALS
Filed April 3, 1961 4 Sheets-Sheet 1
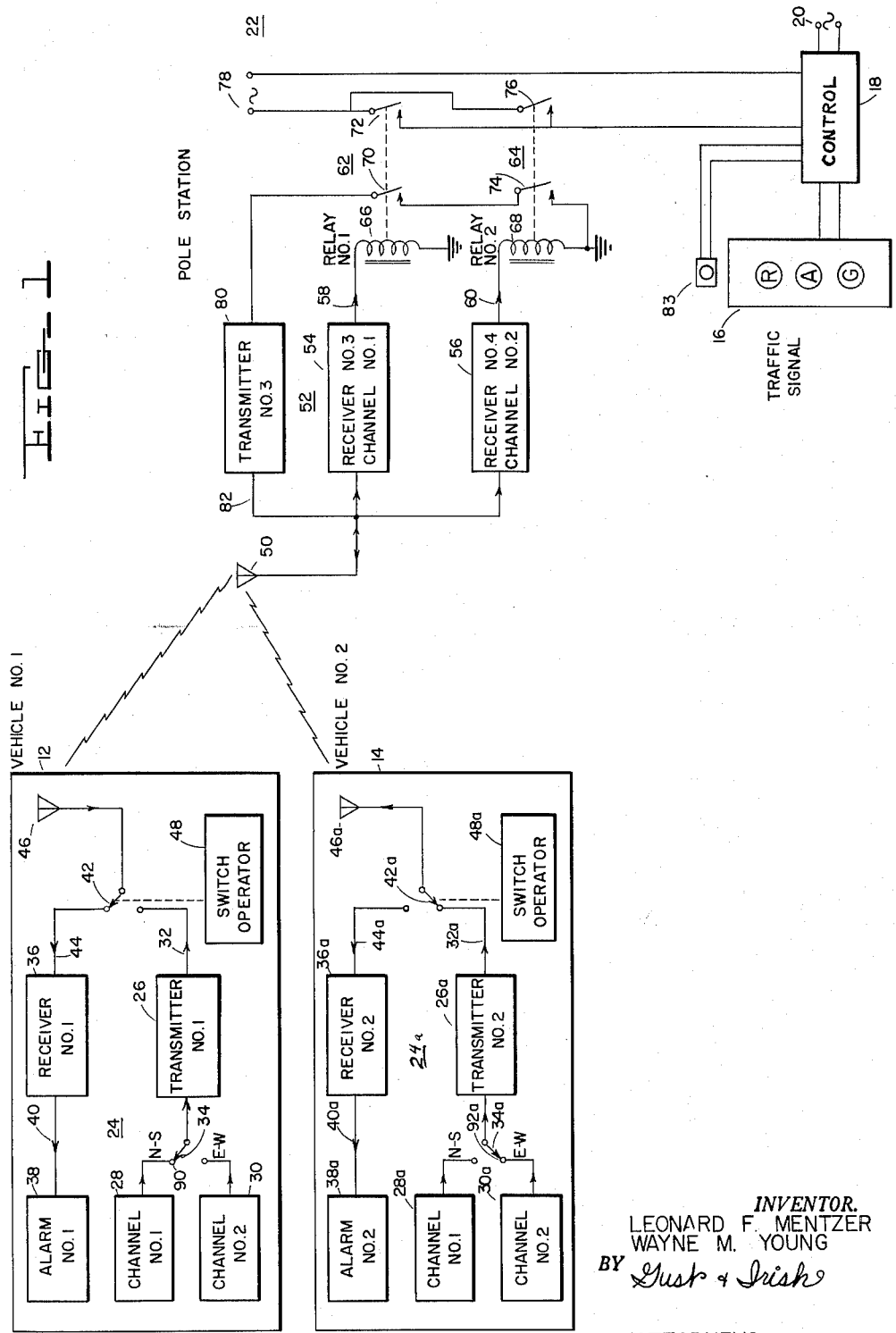
INVENTOR.
LEONARD F. MENTZER
WAYNE M. YOUNG
BY Gust & Irish
ATTORNEYS Sept. 28, 1965  L. F. MENTZER ET AL  3,209,325
SYSTEM FOR EMERGENCY REMOTE CONTROL OF TRAFFIC SIGNALS
Filed April 3, 1961  4 Sheets-Sheet 2
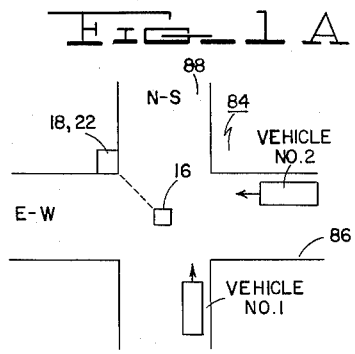
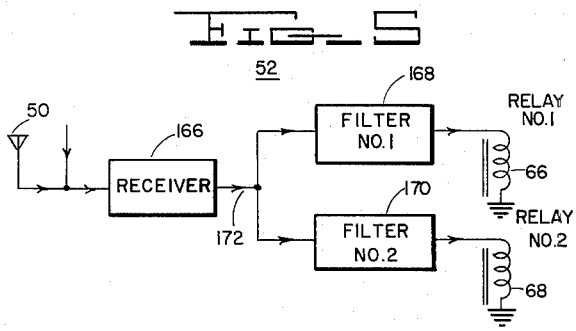
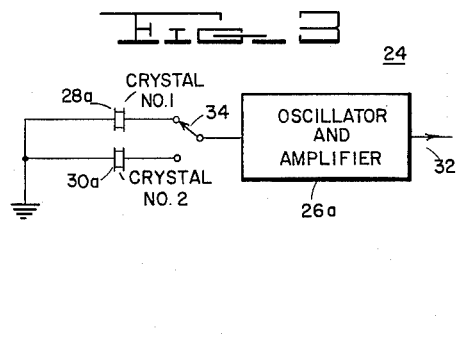
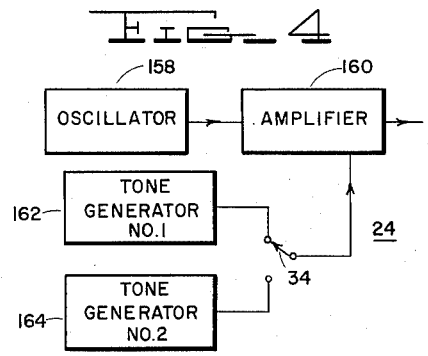
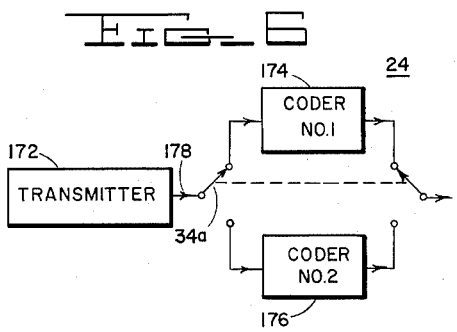
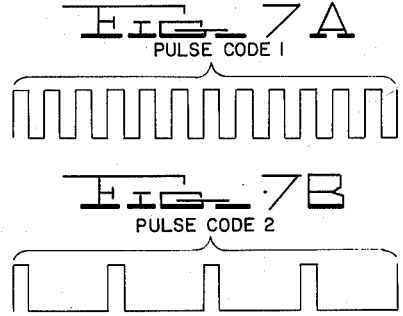
INVENTOR.
LEONARD F. MENTZER
WAYNE M. YOUNG
BY Gust & Irish
ATTORNEYS

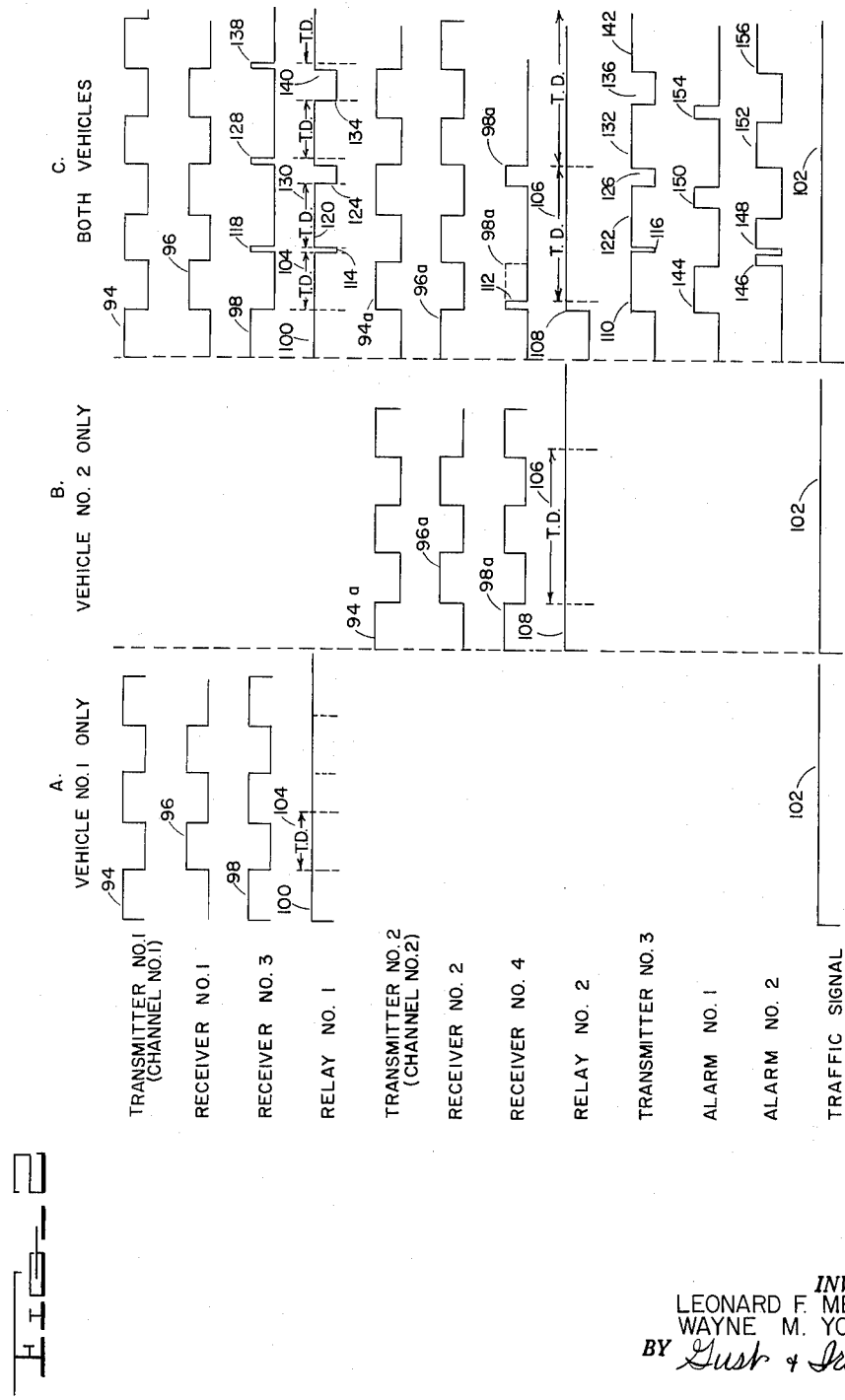

Sept. 28, 1965 L. F. MENTZER ET AL 3,209,325
SYSTEM FOR EMERGENCY REMOTE CONTROL OF TRAFFIC SIGNALS
Filed April 3, 1961 4 Sheets-Sheet 4
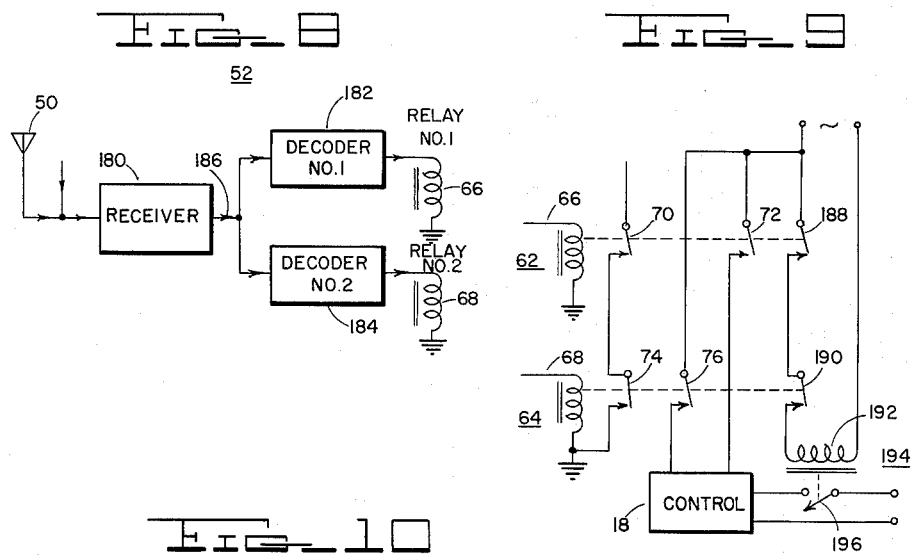
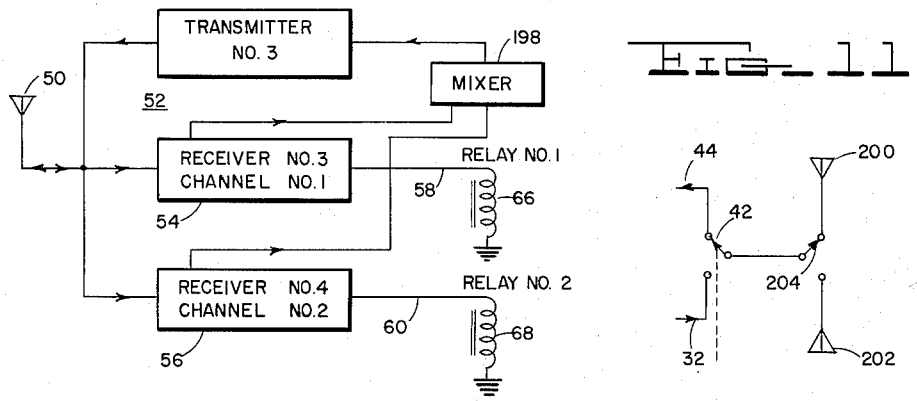
INVENTOR.
LEONARD F. MENTZER
WAYNE M. YOUNG
BY Gust & Irish
ATTORNEYS United States Patent Office 3,209,325
Patented Sept. 28, 1965

3,209,325
SYSTEM FOR EMERGENCY REMOTE CONTROL OF TRAFFIC SIGNALS
Leonard F. Mentzer and Wayne M. Young, Fort Wayne, Ind., assignors to Electro-Controls, Inc., Fort Wayne, Ind., a corporation of Indiana
Filed Apr. 3, 1961, Ser. No. 100,113
12 Claims. (Cl. 340—33)

This invention relates generally to remote control systems and methods of remote control, and more particularly to a system and method for remote control of traffic signals from emergency vehicles.

While the law universally requires all vehicles to give way to emergency vehicles, conventional sirens on emergency vehicles are audible for only a limited distance, and thus emergency vehicles frequently encounter delaying traffic congestion at intersections and occasionally collisions occur between emergency vehicles and other vehicles. Thus, it is desirable to provide a system with which control of traffic signals can be exercised from an emergency vehicle and numerous control systems for this purpose have been proposed. There are instances however, when two or more emergency vehicles may cross the same intersection at the same time and in transverse directions and collisions have occurred between emergency vehicles under such circumstances. It is therefore highly desirable that any system for exercising traffic signal control from emergency vehicles alert the drivers to the fact that more than one vehicle is attempting to control a particular traffic signal and thus to the likelihood of a collision. While some prior radio control systems known to the present applicants have provided on the traffic signal itself a visual signal indicating to a particular vehicle that the traffic signal is under its control, such visual signal does not indicate to the controlling vehicle that another emergency vehicle is attempting to exercise control and on the other hand, the driver of the other vehicle may erroneously assume that his visual control-indicating system is not working and proceed across the intersection and thus precipitating a collision. It is therefore desirable to provide a remote control system for traffic signals which provides an alarm in the vehicles themselves indicating that more than one vehicle is attempting to control a given traffic signal, and further which permits any vehicle readily to verify whether it is exercising control of a particular traffic signal with the verification being received in the vehicle itself.

It is accordingly an object of our invention to provide an improved remote control system.

Another object of our invention is to provide an improved remote control system for traffic signals.

A further object of our invention is to provide an improved remote control method.

Further objects and advantages of our invention will become apparent by reference to the following description and the accompanying drawings, and the features of novelty which characterize our invention will be pointed out with particularity in the claims annexed to and forming a part of this specification.

Our invention, in its broader aspects, provides a method of remotely controlling apparatus at one location, such as a traffic signal, from one of a plurality of remote stations, such as emergency vehicles, and for indicating when more than one remote station is attempting to control the apparatus. In accordance with our invention a first signal having a first predetermined transmission characteristic is transmitted from a first remote station and the first signal is received at the one location and utilized to provide predetermined control of the apparatus. A second signal having a second predetermined transmission characteristic is transmitted from a second remote station, the second signal being received at the one location and utilized to provide predetermined control of the apparatus. A third signal is transmitted from the one location when both the first and second signals are received, the third signal being received at both the remote stations and utilized to indicate that more than one remote station is attempting to control the apparatus.

The improved remote control system of our invention comprises a control station having first radio transmitting means with means for selectively generating signals having two different transmission characteristics. The control station further includes a first receiving means and means for pulsing the first transmitting means "On" and "Off" at a predetermined rate. A controlled station is provided comprising second receiving means having two separate channels and means for respectively providing two output signals in the two channels responsive respectively to the characteristics of the signals transmitted by the first transmitting means. A second transmitting means is provided at the control station for transmitting signals for reception by the first receiving means at the control station and means are provided coupling the second receiving means and the second transmitting means for actuating the same to initiate transmission responsive to reception by the second receiving means of signals having both the transmission characteristics.

In the drawings:

FIG. 1 is a schematic illustration of the improved traffic control system of our invention;

FIG. 1a is a diagram useful in explaining the mode of operation of the system of FIG. 1;

FIG. 2 is a chart useful in explaining the mode of operation of the system of FIG. 1;

FIG. 3 is a fragmentary schematic illustration showing one embodiment of a particular transmitter employed in the system of FIG. 1;

FIG. 4 is a fragmentary schematic illustration showing another embodiment of one particular transmitter which may be employed in the system of FIG. 1;

FIG. 5 is a fragmentary schematic view showing a receiving system for the fixed station employed with the embodiment of FIG. 4;

FIG. 6 is a fragmentary schematic illustration showing another embodiment of the transmitter of the system of FIG. 1;

FIGS. 7a and 7b show pulse codes provided by the embodiment of FIG. 6;

FIG. 8 is a fragmentary schematic illustration of the receiving system at the fixed station employed with the embodiment of FIG. 6;

FIG. 9 is a fragmentary schematic view illustrating a modification of the fixed station portion of the system of FIG. 1;

FIG. 10 is a fragmentary schematic illustration showing another modification of the fixed station portion of the system of FIG. 1; and FIG. 11 illustrates an antenna arrangement for a vehicular station of our invention.

Referring now to FIG. 1, two emergency vehicles, indicated respectively as vehicle No. 1 and vehicle No. 2 are shown schematically at 12 and 14 respectively and a conventional traffic signal 16 is shown which may be located at a street intersection. Control 18 is provided for traffic signal 16 arranged to energize the same from a suitable source of power 20 and normally to program the aspects of the traffic signal 16 in a predetermined sequence in order to provide the desired normal traffic control at the intersection. Cooperating with the control apparatus provided in emergency vehicles 12 and 14, we provide a fixed or "pole" station 22 which overrides control 18 of traffic signal 16 and further transmits back to vehicles 12 and 14 a signal indicating that both vehicles are attempting to control traffic signal 16, as will be hereinafter more fully described.

The apparatus in each of the emergency vehicles 12 and 14 is identical. Considering vehicle 12, we provide a radio transmitter, generally indicated at 24, shown as comprising a transmitting unit and two units 28 and 30 for respectively generating two different transmission characteristics for the signal provided by the transmitter 26. Units 28 and 30 are selectively coupled to transmitter 26 thereby selectively to determine the transmission characteristic of the signal provided thereby in output circuit 32 by manually actuated switch 34.

It will be readily understood that the two different transmission characteristics of transmitter 24 may be two different carrier frequencies in which event units 28 and 30 will be carrier frequency generating units, as seen in FIG. 3, with transmitting unit 26 thus being a final amplifier. In the alternative, the two different transmission characteristics may be two different tone modulation frequencies for a single carrier frequency in which event transmitting unit 26 will comprise an oscillator and amplifier with units 28 and 30 respectively being tone generators of the two different modulating frequencies as shown in FIG. 4. Still further, the two different transmitting characteristics may be two different pulse codes, i.e. the output signal from transmitter 24 may be pulsed with two different codes in which event the units 28 and 30 would be pulse coding units, as seen in FIG. 6. It will be readily apparent to those skilled in the art that other means of providing an output signal from transmitter 24 having two different transmission characteristics are well known to those skilled in the art, such as phase shifting and frequency modulating techniques.

In the ensuing discussion of the system of FIG. 1, it will be assumed that transmitter 24 is arranged to provide two different carrier frequencies and thus the transmitter 24 is as schematically shown in FIG. 3, in which transmitting unit 26 takes the form of an oscillator and amplifier 26a and the units 28 and 30 are crystals 28a and 38a respectively providing two different carrier frequencies.

A receiver 36 is provided for receiving a signal transmitted from the pole station 22, the transmission from the pole station 22 to receiver 26 preferably having still another transmission characteristic, assumed in this case to be on a carrier frequency differing from the carrier frequencies provided by crystals 28a and 30a. An alarm 38, such as a horn or light, or combination of the same is provided coupled to the output circuit 40 of receiver 36 and energized responsive to reception by receiver 36 of a signal transmitted from pole station 22.

Transmitter 24 and receiver 36 are alternately pulsed "On" and "Off" to provide alternate transmitting and receiving intervals. In the illustrated embodiment, this alternate "On" and "Off" pulsing of transmitter 24 and receiver 36 is accomplished by means of a high speed automatically actuated switch 42 which alternately connects output circuit 32 of transmitting unit 26 and input circuit 44 of receiver 36 to antenna 46. Switch 42 is operated by a suitable switch operating device shown schematically at 48 which may comprise a relay operating coil periodically energized by a conventional audio oscillator circuit.

In the system of FIG. 1, crystals 28a and 30a (FIG. 3) may provide carrier frequencies of 155.5 and 156.5 megacycles respectively, i.e., a separation of 1,000 cycles, and the transmission from pole station 22 to receiver 36 may have a carrier frequency of 157.5 megacycles with switch operator 48 providing three (3) "On" and "Off" cycles per second, i.e., transmitter 24 would be "On" with receiver 36 simultaneously "Off," and receiver 36 would be alternately "On" with transmitter 24 simultaneously "Off" three times per second, the transmitting and receiving intervals preferably being of equal duration.

It will be readily comprehended that antenna 46 may be permanently connected to both transmitting unit 26 and receiver 36 with transmitter 24 being pulsed "On" and "Off" thus alternatingly blocking receiver 36 "Off" and "On."

The pole station 22, which is preferably physically located adjacent traffic signal 16, comprises an antenna 50 and a receiver generally indicated at 52, the receiver 52 being capable of receiving and separating or discriminating the two transmission characteristics of the signals transmitted by the transmitter 24 of vehicle 12. With the foregoing assumption that the two signal transmission characteristics are two separate carrier frequencies, two receivers 54 and 56 are shown in FIG. 1 both permanently coupled to antenna 50 and respectively tuned to the two carrier frequencies provided by crystals 28a and 30a, hereinafter referred to as channel No. 1 and channel No. 2 respectively. The receiver 54 for channel No. 1 has an output circuit 58 in which are provided output signals responsive to signals transmitted by transmitter 24 on Channel No. 1, i.e., at the carrier frequency determined by crystal 28a, and receiver 56 has output circuit 60 in which output signals are provided responsive to signals transmitted by transmitter 24 on channel No. 2, i.e., at the carrier frequency determined by crystal 30a. Relays 62 and 64 are provided respectively having operating coils 66 and 68 coupled in output circuits 58 and 60 of receivers 54 and 56 and respectively energized responsive to the output signals therein. Relay 62 is provided with normally open contacts 70 and 72 which are closed responsive to energization of coil 66, and relay 64 has normally open contacts 74 and 76 which are closed responsive to energization of operating coil 68. Contacts 72 and 76 of relays 62 and 64 respectively couple power source 78 to control unit 18 of traffic signal 16 thereby to override the normal control of traffic signal 16 and to provide a predetermined aspect thereon responsive to energization of either operating coil 66 or 68 of relay 62 or 64. As will be more fully described hereinafter, contacts 72 and 76 of relays 62 and 64 may separately connect power source 78 to control 18 so as respectively to provide different aspects on traffic signal 16 responsive to energization of operating coils 66 and 68.

A transmitter 80 is provided at pole station 22 having its output circuit 82 permanently connected to antenna 50 with contacts 70 and 74 of relays 62 and 64 serially connecting transmitter 80 to one side of a source of energizing potential, shown here as being ground. Thus, it will be readily apparent that transmitter 80 is energized thereby to initiate transmission for reception by receiver 36 responsive to both of the contacts 70 and 74 of relays 62 and 64 being closed in turn respectively responsive to energization of both the operating coils 66 and 58. It will be readily seen that by virtue of the permanent coupling of the output circuit 82 of transmitter 80 to the antenna 50, receivers 54 and 56 will be blocked during the periods of transmission of transmitter 80.

In accordance with an important aspect of our invention, relays 62 and 64 are provided with predetermined time delays on drop-out, i.e., the opening of contacts 70 and 72 of relay 62 and 74 and 76 of relay 64 are respectively delayed for predetermined times following deenergization of operating coils 66 and 58, the time delay of relay 62 being longer than one receiving interval provided by switch 42 and the time delay of relay 64 being preferably substantially longer than the time delay of relay 62.

In the operation of our improved traffic control system as shown in FIG. 1, it is contemplated that emergency vehicles approaching a given intersection on one street will use one predetermined channel and that vehicles approaching the same intersection on another street will use the other channel. Thus, referring briefly to FIG. 1a, intersection 84 of east-west street 86 and north-south street 88 is shown and it will previously have been determined that vehicles approaching intersection 84 on north-south street 88 will utilize channel No. 1 and that vehicles approaching intersection 84 on the east-west street 86 will utilize channel No. 2. Thus, when vehicle No. 1 is approaching intersection 84, in order to take over control of traffic signal 16 from its regular control 18, the driver will turn his manual switch 34 to the north-south position 90 which, as previously explained, will connect crystal 28a to the oscillator and amplifier 26a so that the transmitter 24 of vehicle No. 1 transmits on the No. 1 channel, i.e., one of the two different carrier frequencies. Likewise, the driver of vehicle No. 2 approaching intersection 84 of the east-west street 86 in order to take over control of traffic signal 16 will turn his manual switch 34 to the east-west position 92 thereby connecting crystal 30a to the oscillator and amplifier 26a of vehicle No. 2 so that transmitter 24 of vehicle No. 2 transmits on channel No. 2, i.e. on the other carrier frequency.

Referring now additionally to FIG. 2a, it will first be assumed that vehicle No. 1 only is approaching intersection 84 on the north-south street 88 and that the driver desires to exercise control over the traffic signal 16. At this juncture, it should be pointed out that depending upon the nature of the intersection, it may be desired that the aspect of traffic signal 16 be changed to red on all sides, or red only on the east-west street 86, the particular aspect of the traffic signal 16 which is provided responsive to the transmission of vehicles Nos. 1 and 2 not forming a part of our invention, but rather being within the provence of traffic engineers skilled in the art of traffic control. Proceeding, as vehicle No. 1 approaches intersection 84 on the north-south street 88, the driver turns his switch 34 to north-south position 90 thus causing the transmitter 24 to transmit signals on channel No. 1, i.e., the first of the two different carrier frequencies, switch 42 in turn pulsing the signal provided by transmitter 24 "On" and "Off" to provide transmission intervals 94 and receiving intervals 96, as shown in FIG. 2a; as will be seen the receiving intervals 96 provided for receiver 36 of vehicle No. 1 by switch 42 are not utilized when only vehicle No. 1 is approaching intersection 84.

The transmissions 94 on channel No. 1 from transmitter 26 of vehicle No. 1 are received by receiver 54 of pole station 22 which is tuned to channel No. 1 thereby providing output signals 98 which are pulsed "On" and "Off" in synchronism with the transmission pulses 94 as shown in FIG. 2a. Thus, operating coil 66 of relay 62 (relay No. 1) will be energized by the first output pulse 98, as shown at 100 in FIG. 2a thus closing contacts 70 and 72, the closing of contacts 72 exercising the desired control over the traffic signal 16 as shown at 102 in FIG. 2a. When the first output signal pulse 98 terminates responsive to termination of the first transmission pulse 94, operating coil 66 of relay 62 is deenergized, however, by virtue of the time delay 104 provided in the drop-out of relay 62, contacts 70 and 72 will remain closed for the period of the time delay which is shown to be longer than a receiving interval 96, i.e., the period between successive transmitting intervals 94 (and output pulses 98). Thus, another transmission interval 94 and output pulse 98 has occurred prior to the expiration of the time delay period 104 and therefore, operating coil 66 of relay 62 will again be energized so that contacts 70 and 72 will remain picked up or closed and control signal 102 will be maintained continuousy while vehicle No. 1 is approaching traffic signal 16 at intersection 84 so long as the driver maintains his switch 34 in the north-south position 90. It will be seen that the time delay 104 for relay 62 is necessary in order to prevent the aspect of the traffic signal 16 from jittering or flashing during the receiving intervals 96 intermediate the transmission intervals 94. It will be understood that still further time delay will ordinarily be provided in the control circuitry of the conventional control 18 for the traffic signal 16 thus positively assuring that the desired aspect of traffic signal 16 is maintained during the approach of vehicle No. 1 toward traffic signal 16 at intersection 84.

Referring now to FIG. 2b, operation of the system of our invention from vehicle No. 2 alone as it approaches intersection 84 and traffic signal 16, i.e. in the absence of vehicle No. 1 is substantially identical to the above-described operation of the system for vehicle No. 1 alone, however the time delay 106 of relay 64 of the pole station 22 is substantially longer than time delay 104 of relay 162, as will be hereinafter described. Here, when vehicle No. 2 approaches intersection 84 the driver moves his switch 34a to the east-west position 92 thus to initiate transmission of signals from his transmitter 24a on channel No. 2, i.e. at the carrier frequency generated by crystal 30a. Again, switch 42a of vehicle No. 2 alternately connects transmitter 24a and received 36a to antenna 46a to provide the transmitting intervals 94a and receiving intervals 96a with the output signal of receiver 56 which is tuned to channel No. 2 being substantially in synchronism with transmitting intervals 94, as at 98a in FIG. 2b. Thus, operating coil 68 of relay 64 will be energized responsive to output signal 98a of receiver 56 thereby closing contacts 74 and 76 as at 108. Again when the first transmitting interval 94a terminates, the output signal of receiver 56 likewise terminates thereby deenergizing operating coil 68 of relay No. 2, however, contacts 74 and 76 of relay 64 remain picked up or closed for the duration of time delay 106. We consider it desirable that time delay 106 have a duration of at least twice that of time delay 104 of relay 70 and it will further be readily apparent that time delay 106 must normally run out during the occurence of a transmitting interval 94a so that when the time delay would normally expire, the opearting coil 68 is again energized thereby to maintain the contacts 74 and 76 closed in order in turn to maintain the desired aspect of traffic signal 16 without flickering or jittering. Here, if time delay 106 had exactly twice the duration of time delay 104, it would expire during a receiving interval 96a, i.e. the space between transmitting intervals 94a and thus since operating coil 68 of relay 64 would not be energized during this interval, contacts 74 and 76 would momentarily open to cause a momentary change in the aspect presented by traffic signal 16. Thus, in addition to the requirement that time delay 106 should be at least twice as long as time delay 104, it can be stated that it should exceed three (3) intervals 94a, 96a so as normally to run out during the occurrence of a transmitting interval 94a. It will be readily seen that closing of contacts 76 responsive to initial energization of operating coil 68 overrides the control 18 to provide the desired predetermined aspect on traffic signal 16.

It will now be readily seen with either vehicle No. 1 or vehicle No. 2 alone exercising control over traffic signal 16, only one of the contacts 70, 74 will be closed and thus, since closing of both the contacts 74, 70 is necessary to energize transmitter 80, there will be no transmission back to vehicle No. 1, or vehicle No. 2 as the case may be.

Referring now to FIG. 2c, the mode of operation with both vehicles Nos. 1 and 2 initiating transmission will be explained. There is no requirement that the pulsing rates provided by the switches 42 of vehicles Nos. 1 and 2 be identical or that the transmitting and receiving intervals respectively be in phase and in FIG. 2c, identical transmitting and receiving intervals are shown for the vehicles Nos. 1 and 2 which, however, are shown as being 180° out of phase. Here again, as vehicle No. 1 approaches intersection 84, the driver will turn his switch 34 to the north-south position 90 thereby to initiate transmission on channel No. 1 with switch 42 providing the transmission intervals 94 and receiving intervals 96. Likewise as vehicle No. 2 approaches intersection 84, its driver will turn his switch 34a to the east-west position 92a to initiate transmission on channel No. 2 with switch 42a again providing transmitting intervals 94a and receiving intervals 96a. It will be seen that upon the occurrence of the first transmitting interval 94 from vehicle No. 1, output signal 98 will be provided from receiver 54 on channel No. 1 causing coil 66 of relay 62 to pick up thereby closing contacts 70 and 72 as at 100. Upon the termination of the first transmitting interval 94, the output signal 98 of receiver 54 likewise terminates to deenergize coil 66 of relay 62, however contacts 70 and 72 remain closed by virtue of time delay 104.

With the assumption that the transmitting intervals 94a from vehicle No. 2 are 180° out of phase with respect to the transmission intervals 94 of vehicle No. 1, the first transmitting interval 94a will occur during the first receiving interval 96 of vehicle No. 1, the first transmitting interval 94a of vehicle No. 2 in turn providing output signal 98a from receiver 56 thus energizing coil 68 of relay 64 and closing contacts 74 and 76 as at 108. However, as soon as contacts 74 close, it will be seen that contacts 70 of relay 72 are still closed by virtue of time delay 104 and thus, transmitter 80 will be energized to initiate a first transmission as shown at 110. As previously indicated, transmission from transmitter 80 blocks receivers 54 and 56 and thus, the output signal 98a from receiver 56, which normally would be coextensive in duration with transmitting interval 94a, as shown in dashed lines, is terminated as at 112. However, contacts 74 and 76 of relay 64 remain closed by virtue of time delay 106 and thus the transmitter continues to generate transmission 110. Upon the expiration of the first time delay 104 of relay 164, receiver 54 has been blocked by virtue of the transmission of transmitter 80 and thus at this time there is no output signal 98 and therefore the relay 62 will drop out thereby opening contacts 70 and 72, as at 114. Opening of contacts 70 momentarily terminates the transmission of transmitter 80, as at 116 which in turn unblocks receivers 54 and 56. At this time transmitter 24 of vehicle No. 2 is not transmitting, however transmitter 24 of vehicle No. 1 is transmitting the second transmission interval 94 and thus receiver 54 provides a second momentary output signal 118, which energizes its coil 66 to again close contacts 70 and 72 as at 120. We observed that contacts 74 and 76 of relay 64 remain closed at this point by virtue of the longer time delay 106, and thus transmission of transmitter 80 is again initiated as at 122 again blocking receivers 54 and 56 immediately to terminate the output signal 118 from receiver 54 and deenergize coil 66 of relay 62, contacts 70, 72 however remaining closed by virtue of the time delay. When the second time delay period of relay 62 expires, as at 124, transmitter 24 of vehicle No. 1 is not transmitting and thus, when contacts 70 open thereby terminating transmission of transmitter 80, as at 126, there is at that instant no transmission interval 94 and therefore no output signal from receiver 54. It will be observed that when contacts 70 of relay 62 drops out at 124 to terminate transmission of transmitter 80, the second transmission interval 94a from transmitter 24 of vehicle No. 2 is in progress and thus, with receiver 56 being unblocked coincident with termination of the transmission 122 of transmitter 80, another output signal 98a will be provided from receiver 56 which again energizes operating coil 68, the contacts 74 and 76 however already have been closed by virtue of time delay 106. Thus, with continuous transmission from both vehicles Nos. 1 and 2, relay 64 at no time drops out to open its contacts 74 and 76 and thus the aspect 102 of traffic signal 16 is constantly maintained.

The third transmission interval 94 of vehicle No. 1 again provides a momentary output signal 128 from receiver 54 which momentarily energizes coil 66 again to close contacts 70 and 72 as at 130. Since as indicated, contacts 74 and 76 of relay 64 remain closed constantly by virtue of the time delay 106, transmitter 80 is again energized as at 132 thereby blocking receiver 52, deenergizing coil 66 and initiating yet another time delay 104. The third time delay 104 expires at 134 during a receiving interval 96 intermediate transmitting intervals 94 and thus, even though dropping out of relay 62 and opening of contacts 70 and 72 terminate transmission 132 of transmitter 80, as at 136, there is no transmission interval 94 from vehicle No. 1 in progress at that instant. However, the fourth transmitting interval 94 provides a momentary output signal 138 from receiver 52 to energize its coil 66 and again pick-up contacts 70 and 72, as at 140 to again initiate the transmission 142 from transmitter 80. At this point it will be observed that the intervals 116, 126, 136 between the transmission intervals 110, 122, 132 and 142 from transmitter 80 progressively lengthen, it being readily comprehended as operation continues, that these intervals will reach a maximum length and thereafter again decrease. The effect of this variation and the intervals between transmission and transmitter 80 will be immediately apparent.

It will be recalled that receivers 36 of vehicles Nos. 1 and 2 are tuned to receive the transmission from transmitter 80 at the pole station 22. Thus, it will be observed that the first transmission 110 from transmitter 80 will be received by receiver 36 of vehicle No. 1 during receiving interval 96 thereby to actuate alarm 38 of vehicle No. 1 as at 144. It will likewise be observed that the first transmitting interval 110 will be received by receiver 36a of vehicle No. 2 during the first portion of receiving interval 96a thereby to actuate alarm 38 of vehicle No. 2 momentarily, as at 146. Interval 116 between transmission intervals 110 and 122 naturally deactuates alarm 38a of vehicle No. 2, however it is again actuated as at 148 during the remainder of receiving interval 96a during which a portion of transmission interval 122 from transmitter 80 is received. The remaining portion of transmission interval 122 is received by receiver 36 of vehicle No. 1 during the second reciving interval 96 thereby again to actuate alarm 38 of vehicle No. 1 as at 150. Likewise, transmission interval 132 is received by receiver 36a of vehicle No. 2 to actuate the alarm of vehicle No. 2 during transmission interval 132, as at 152 and a portion of transmission interval 132 is received by receiver 36 of vehicle No. 1 to actuate its alarm, as at 154, transmission interval 142 actuating the alarm of vehicle No. 2, as at 156.

It will now be seen that when vehicles Nos. 1 and 2 are appoaching intersection 84 at the same time and are both transmitting in an attempt to control traffic signal 16, transmitter 80 is pulsed "On" and "Off" by the delay circuitry provided by relay 62, this pulsing being at a variable rate and further by virtue of the pulsing of the transmitters of the vehicles Nos. 1 and 2, causing a pulsating type of alarm actuating signal in both vehicles which may in turn be employed to provide a flashing alarm light or a pulsating audible alarm. Further, it will be seen that by virtue of the fact that relay 54 remains constantly closed while both vehicles are transmitting, the desired traffic signal aspect will be constantly maintained.

In addition to the foregoing, it may also be desirable to provide a supplemental signal indication 83 actuated by control 18 which by means of a flashing light, or some other conventional type of indication, advises drivers of non-emergency vehicles and pedestrians that the signal is in fact in working order, even though a red indication may be displayed for what appears to be an unusually long length of time. In the case of intersections equipped with "walk"—"wait" signals, control 18 may also be arranged to turn all of these signals to the "wait" indication in response to actuation by an emergency vehicle.

Referring now to FIGS. 4 and 5, as indicated, the transmitter 24 may comprise a conventional oscillator 158 and amplifier 160 with tone generators 162 and 164 selectively connected to the amplifier 106 by switch 34 to tone modulate the output signal from the amplifier 160 on two different frequencies to provide the two different transmission characteristics or channels. With this arrangement receiver 52 of pole station 22 will comprise a conventional receiver 166 and two suitable filters 168 and 170 respectively connecting the output circuit 172 of receiver 166 to relay coils 66 and 68, the filters 168 and 170 being tuned to respectively pass the modulating frequencies provided by the tone generators 162 and 164.

Referring now to FIGS. 6, 7a and 7b and 8, transmitter 24 may comprise an oscillator and amplifier 172 which in common with the oscillator amplifier 158, 160 of FIG. 4, provides a single carrier frequency, suitable pulse coders 174 and 176 being selectively connected in the output circuit 178 of the oscillator amplifier 172 by switch 34a. Coder 174 may provide a pulse code as shown in FIG. 7a thus providing the first transmission characteristic or channel and coder 176 may provide a different pulse code as shown in FIG. 7b thus to provide a second transmission characteristic. In this case, receiver 52 again comprises a conventional receiver 180 with decoders 182 and 184 interconnecting its output circuit 186 and operating coils 66 and 68, as shown, decoders 182 and 184 respectively discriminating between the first and second pulse codes as is well known to those skilled in the art.

Referring now to FIG. 9, while in the system of FIG. 1 contacts 72 and 76 of relays 62 and 64 are shown as being connected in parallel and thus it will be comprehended that the same aspect will be provided on traffic signal 16 responsive to control from either vehicle No. 1 or vehicle No. 2 alone, or both vehicles, such aspect presumably being red; inspection of FIG. 1a will reveal that if streets 86 and 88 are respectively one way streets it may be desirable that when vehicle No. 1 or vehicle No. 2 alone exerts control over light 16, a fixed green aspect should be provided on the respective side, but with both vehicles attempting to exert control, a fixed red aspect should be provided on all sides. Thus, in the embodiment of FIG. 9, contacts 72 and 76 separately energize control 18 thus to provide the predetermined aspects on traffic signal 16 here, however, relays 62 and 64 are respectively provided with additional contacts 188 and 190 which are serially connected as shown with operating coil 192 of relay 194 which has its contacts 196 connected to control 18. Relay 194 is provided with a predetermined time delay substantially longer than the time delay of relay 62 thus maintaining the predetermined aspect on traffic signal 16, presumably red on all sides so long as both vehicles Nos. 1 and 2 are approaching intersection 84 and attempting to control signal 16; as previously indicated under such circumstances both vehicles will be receiving an alarm signal from transmitter 80 at pole station 22.

Referring now to FIG. 10, in the event the two transmission characteristics or channels are two separate carrier frequencies, transmitter 80 may be energized by a gating signal provided from mixer 198 which mixes or heterodynes the two carrier frequencies or the two I.F. frequencies in receivers 54 and 56 if the receivers are of the superheterodyne type.

Referring now to FIG. 11 in which like elements are still indicated by like reference numerals, the antenna 46 of the vehicular stations may be replaced by two antennas 200 and 202. Here, antenna 200 is a directional antenna of the horizontally polarized type which is mounted on the forward part of the vehicle, such as on the front bumper, and which provides a forward pattern, the vehicle itself acting as a screen to attenuate the rearward lobe of the antenna pattern. Antenna 202 on the other hand is a conventional vertically polarized antenna mounted in a suitable location on top of the vehicle thus providing a substantially 360° pattern. Directional antenna 200 and non-directional antenna 202 are selectively connected to the switch 42 by a manually actuated switch 204. Thus, when the emergency vehicle is making a straight run in a given direction with no turns being anticipated the operator throws switch 204 to the position to connect directional antenna 200 which, by virtue of its forward directional pattern, will actuate the traffic signals in a straight line path ahead of the vehicle but will not actuate signals on adjacent streets. On the other hand, if it is contemplated that the emergency vehicle will be making a turn so that it is desired to actuate not only the signal ahead of the emergency vehicle, but also one or more signals on a cross sheet into which the vehicle will turn, the operator will then throw switch 204 to connect the non-directional antenna 202 which, by virtue of its 360° pattern will actuate all traffic signals within a given radius.

The above described system and method inherently provides a means and method by which any one vehicle can verify whether or not it is actually exerting control over the traffic signal 16. Thus, considering vehicle No. 1 the driver can move his switch 34 to position 90 momentarily and then immediately move it to position 92. The initial transmission on channel No. 1 as the result of the switch being in position 90 will result in picking up relay 62 and initiation of the time delay 104 and the shifting of switch 34 to position 92 then results in transmission of channel No. 2 which in turn results in picking up relay 64 so that both contacts 70 and 74 will be closed for at least an interval sufficiently long enough to initiate transmission from transmitter 80 which in turn will be received by receiver 36 to actuate alarm 38. Thus, a vehicle on an emergency run can rapidly verify whether it is in fact exercising control over any given traffic signal, and further, maintenance vehicles can readily check all traffic signals to determine whether the remote control system is functioning properly.

While the improved remote control system and method of our invention finds particular utility for the remote control of the vehicular traffic signals, it will be readily apparent that it may find utility in other applications in which apparatus may be remotely controlled from any one of a plurality of control stations and it is desired to provide an indication when more than one station is attempting to exert control.

While we have described specific embodiments of our invention, further modifications and improvements will occur to those skilled in the art and we desire therefore in the appended claims to cover all modifications which do not depart from the spirit and scope of this invention.

What is claimed is:

1. A remote control system comprising: first and second control stations each comprising first radio transmitting means having means for selectively transmitting two signals respectively having different characteristics, first receiving means, first antenna means, means coupling said first transmitting means and said first receiving means to said first antenna means; and a controlled station comprising second receiving means including means for providing two control signals respectively in two different channels responsive respectively to the characteristics of the signals transmitted by said first transmitting means, second radio transmitting means for transmitting signals for reception by said first receiving means, second antenna means, means coupling said second transmitting means and second receiving means to said second antenna means, and means coupled to said second receiving means and to said second transmitting means for actuating said second transmitting means responsive to simultaneous reception by said second receiving means of signals from both of said control stations respectively having said different characteristics.

2. A remote control system comprising; first and second control stations each comprising first radio transmitting means having means including means for selectively generating two signals respectively having different characteristics, first receiving means, means for pulsing said first transmitting means "On" and "Off" at a predetermined rate; and a controlled station comprising second receiving means including means having two separate channels and means for respectively providing two output signals in said channels responsive respectively to the characteristics of the signals transmitted by said first transmitting means, two output circuits, first and second switching means respectively coupling said output circuits to said channels responsive respectively to said output signals, second transmitting means for transmitting signals for reception by said first receiving means, and third switching means actuated by both of said control signals responsive to simultaneous reception by said second receiving means of signals from both of said control stations respectively having said different characteristics for initiating transmission of said second transmitting means.

3. The combination of claim 2 wherein said first and second switching means respectively have time delays following termination of the respective control signals, one of said time delays being longer than the other.

4. The combination of claim 2 further comprising means for terminating reception of said second receiving means during transmission of said second transmitting means, and wherein said first and second switching means repectively have time delays following termination of the respective control signal, one of said time delays being longer than one "Off" period of said first transmitting means and the other time delay being at least twice as long as said one time delay.

5. In a remote control system for a traffic signal having a plurality of aspects; the combination with said traffic signal of first and second vehicular control stations, and a fixed control station; each of said vehicular stations comprising first radio transmitting means having means for selectively transmitting two signals respectively having different characteristics, first receiving means, antenna means, means for alternately coupling said antenna means to said first transmitting means and to said first receiving means at a predetermined rate thereby to provide alternate transmitting and receiving intervals; said fixed station comprising second receiving means including means for providing two-control signals respectively in two different channels responsive respectively to the characteristics of the signals transmitted by said first transmitting means in two different channels, second radio transmitting means for transmitting signals for reception by said first receiving means, first means coupling one of said channels and said traffic signal for providing a predetermined aspect thereon responsive to a control signal in said one channel, second means independently coupling the other of said channels and said traffic signal for providing a predetermined aspect thereon responsive to a control signal in said other channel, and third means actuated by both of said control signals responsive to simultaneous reception by said second receiving means of signals from both of said control stations respectively having said different characteristics for initiating transmission of said second transmitting means.

6. In a remote control system for a traffic signal having a plurality of aspects; the combination with said traffic signal of first and second vehicular control stations; and a fixed control station; each of said vehicular stations comprising first radio transmitting means having means for selectively transmitting two signals respectively having different characteristics, first receiving means, antenna means, means for alternately coupling said antenna means to said first transmitting means and to said first receiving means at a predetermined rate thereby to provide alternate transmitting and receiving intervals; said fixed station comprising second antenna means, second receiving means coupled to said second antenna means for receiving the signals transmitted by said first transmitting means, said second receiving means including means for separating the signals of one characteristic from the signals of the other characteristic to provide first and second control signals responsive respectively to the characteristics of the signals transmitted by said first transmitting means, said second receiving means having first and second output circuits for said first and second control signals respectively, second radio transmitting means coupled to said second antenna means for transmitting signals for reception by said first receiving means, first means coupling said first output circuit and said traffic signal for providing a predetermined aspect thereon responsive to said first control signal, second means independently coupling said second output circuit and said traffic signal for providing a predetermined aspect thereon responsive to said second control signal, and third means actuated by both of said control signals responsive to simultaneous reception by said second receiving means of signals from both of said control stations respectively having said different characteristics for energizing said second transmitting means to initiate transmission thereof.

7. The combination of claim 6 wherein said third means comprises means coupling both of said output circuits to said second transmitting means for initiating transmission thereof responsive to simultaneous occurrence of both said control signals.

8. The combination of claim 6 wherein said second transmitting means during its transmission blocks said second receiving means, and wherein said first and second coupling means respectively include time delay means, one of said time delay means having a longer time delay than the other.

9. The combination of claim 6 wherein said second transmitting means during its transmission blocks said second receiving means, wherein said third coupling means comprises first and second parts respectively coupling said output circuits to said second transmitting means and respectively associated with said first and second coupling means, wherein said first coupling means and first part include first time delay means for maintaining the respective traffic signal aspect and energization of said second transmitting means for a first predetermined time delay following termination of said first control signal, said first time delay being longer than one said receiving interval, and wherein said second coupling means and second part include second time delay means for maintaining the respective traffic signal aspect and energization of said second transmitting means for a second predetermined time delay following termination of said second control signal, said second time delay being longer than said first time delay.

10. In a remote control system for a traffic signal having a plurality of aspects and control means for normally programing said aspects; the combination with said control means of a vehicular control station; and a fixed control station; said vehicular station comprising a first radio transmitter, first and second means for respectively providing two different characteristics for the signal provided by said first transmitter manually actuated switching means for selectively coupling said first and second means to said first transmitter thereby selectively to provide a signal having a first or second characteristic, a first receiver, alarm means coupled to said receiver and actuated thereby in response to receipt of a signal, first antenna means, automatic switching means for alternately coupling said antenna means to said first transmitter and to said first receiver at a predetermined rate thereby to provide alternate transmitting and receiving intervals; said fixed station comprising second antenna means, second receiving means coupled to said second antenna means for receiving the signals transmitted by said first transmitter, said second receiving means including means for separating the signals of one characteristic from the signals of the other characteristic to provide first and second control signals responsive respectively to the characteristics of the signals transmitted by said first transmitter, said second receiving means having first and second output circuits for said first and second control signals respectively, first and second relays having operating coils respectively coupled in said output circuits and energized responsive respectively to said first and second control signals, each of said relays having first and second contacts which are closed responsive respectively to energization of said coils, said first contacts when closed respectively coupling said traffic signal control means to a source of potential for overriding said control means and providing predetermined aspects on said traffic signal responsive respectively to said first and second control signals, second radio transmitter coupled to said second antenna means for transmitting signals for reception by said first receiver, said second transmitter when transmitting blocking said second receiver thereby terminating said control signals, said second contacts when both closed serially connecting said second transmitter to a source of energizing potential thereby to initiate transmission therefrom, said first relay having means providing a first predetermined time delay for maintaining the respective first contact closed thereby to maintain the respective traffic signal aspect and for maintaining the respective second contact closed following termination of said first control signal, said first time delay being longer than one said receiving interval, said second relay having means providing a second predetermined time delay for maintaining the respective first contact closed thereby to maintain the respective traffic signal aspect and for maintaining the respective second contact closed following termination of said second control signal, said second time delay being longer than three said intervals.

11. In a system for remotely controlling a traffic signal having a plurality of aspects; the combination with said traffic signal of a fixed radio control station comprising; first and second channels, means for respectively receiving in said first and second channels first and second radio signals respectively having different transmission characteristics; said receiving means including first means coupled to said traffic signal for providing a predetermined aspect thereon responsive to the first radio signal and second means independently coupled to said traffic signal for providing a predetermined aspect thereon responsive to the second radio signal; each of said coupling means having means providing a predetermined time delay following termination of the respective radio signal, one time delay being longer than the other; means for transmitting a third radio signal from said station; and third means responsive to simultaneous reception of both the said first and second radio signals for initiating transmission of said third radio signal.

12. In a remote control system for a traffic signal having a plurality of aspects and control means for normally programing said aspects; the combination with said control means of a fixed radio control station comprising: means for receiving first and second radio signals having different transmission characteristics, said receiving means including means for discriminating between said signals to provide first and second output signals respectively responsive to said first and second radio signals; a first relay having an operating coil coupled in said first output circuit and energized responsive to said first output signal, said first relay having first and second contacts which are closed responsive to energization of its coil; a second relay having an operating coil coupled in said second output circuit and energized responsive to said second output signal, said second relay having first and second contacts which are closed responsive to energization of its coil; said second contacts of said first relay when closed coupling a source of potential to said control means for overriding the same to provide a predetermined aspect on said traffic signal responsive to said first output signal; said second contacts of said second relay when closed coupling a source of potential to said control means for overriding the same to provide a predetermined aspect on said traffic signal responsive to said second output signal; said first and second relays respectively having means providing first and second predetermined time delays in opening the respective contacts following termination of the respective output signals, one time delay being longer than the other; and a transmitter for transmitting a third signal from said fixed station; said first contacts of said first and second relays when both closed serially coupling said transmitter to a source of potential thereby energizing the same to initiate said third radio signal responsive to occurrence of both of said output signals.

References Cited by the Examiner

UNITED STATES PATENTS

| 2,475,578 | 7/49 | Halstead | 325—22 |
| 2,741,601 | 4/56 | MacCready | 340—171 X |
| 2,864,943 | 12/58 | Schultz | 340—163 |
| 2,881,409 | 4/59 | Cook | 340—33 |
| 2,899,674 | 8/59 | Sierer | 340—224 X |
| 2,903,674 | 9/59 | Schwab | 340—33 |
| 2,978,676 | 4/61 | Spencer | 340—226 X |

NEIL C. READ, *Primary Examiner.*

BENNETT G. MILLER, *Examiner.*